Patented Nov. 19, 1946

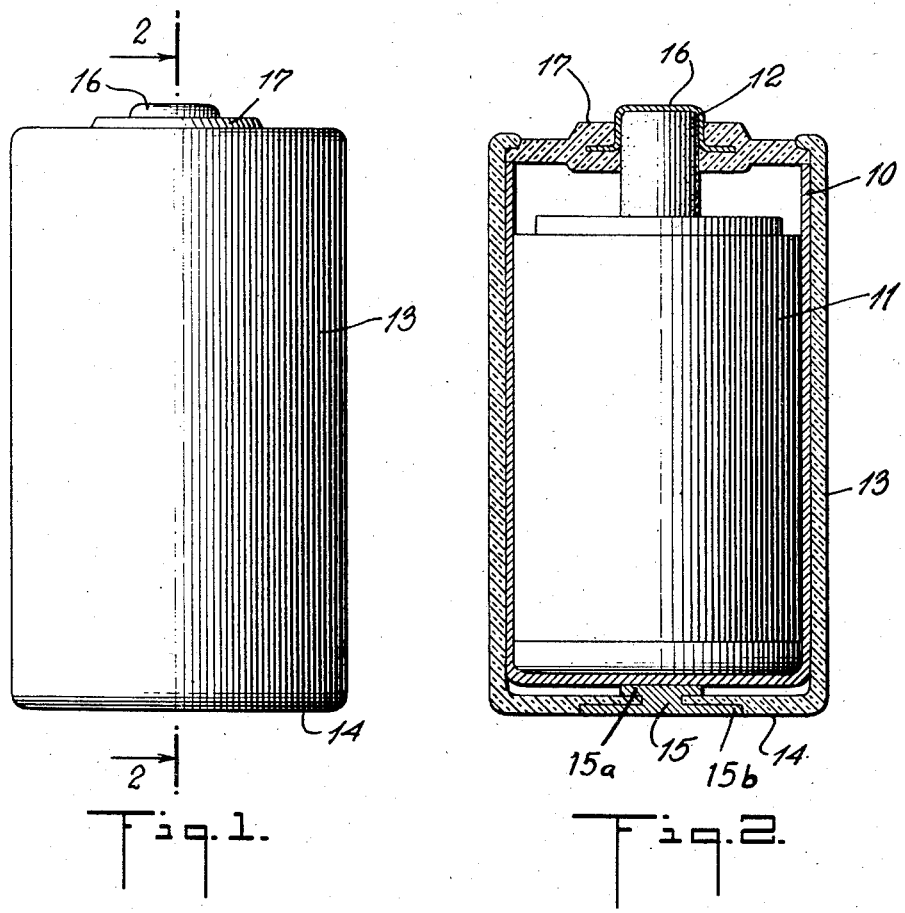

2,411,272

UNITED STATES PATENT OFFICE 2,411,272

BATTERY

Frederick A. Keller, East Paterson, N. J., assignor to Bright Star Battery Company, Clifton, N. J., a corporation of New Jersey Application August 21, 1943, Serial No. 499,477

1 Claim. (Cl. 136—133)

This invention relates to batteries and more especially to flashlight batteries.

An object of this invention is an improved flashlight battery construction.

A battery constructed according to the present invention comprises a cup of zinc or other suitable metal containing a cartridge having a centrally arranged electrode of carbon or other suitable material. A shell of ethyl cellulose or other suitable plastic material closed at one end fits over the closed end of the cup and a cover of plastic material engages the rim of the cup and is sealed to the edge of the shell. A metal cap is sealed in the cover with a portion of the cap exposed and with the cap receiving the end of the central electrode. The cap is embedded in the cover such that no portion of it is exposed to contact by electrolyte which may escape from the cartridge.

The plastic shell forms a gas-tight seal with the plastic cover and also obviates the need of the paper tube now used to insulate the curved surface of the cup. By reason of the cap being embedded in the plastic material, no washers are required over the top of the cartridge as heretofore to prevent contact of escaped electrolyte with the cap. For this reason, the usual spacing between the top of the cartridge and the sealing member may be decreased thereby making it possible to increase the length of the cartridge and thus provide additional electrolyte without changing the overall length of the battery. Also, for the same overall length of battery a shorter cup may be used, thus conserving zinc.

Other objects, novel features and advantages of this invention will become apparent from the following specification and accompanying drawing, wherein:

Fig. 1 is a side elevation of a flashlight battery embodying the invention and

Fig. 2 is a section on the line 2—2 of Fig. 1.

In Fig. 2, 10 indicates the usual zinc cup of a flashlight battery in which is contained the usual cartridge 11. A centrally arranged carbon electrode 12 is embedded in the cartridge in the usual manner and projects above the rim of the cup 10. A shell 13 of plastic material surrounds the cup 10 and is provided at one end with an integral closure 14 in which is embedded a metal member 15. A metal rivet-like member 15 extends through an aperture in the closure 14 and is provided with an interior head 15a and exterior head 15b seated in a recess in the outer surface of the closure 14 flush with said surface. The interior head 15a engages the zinc cup 10 while the head 15b constitutes the bottom terminal of the battery. A metal cap 16 is embedded in a disk 17 of plastic material the periphery of which rests on the rim of the cup 10 and is sealed to the edge of the shell 13. The shell 13 and disk 17 may be composed of ethyl cellulose or other suitable plastic material. The cap 16 is so arranged as to receive the upper end of the carbon electrode 12 and has a portion extending beyond the outer surface of the disk. The flange of the cap is embedded in the plastic material in such manner that with the electrode inserted no portion of the cap is exposed to attack by electrolyte escaping from the cartridge. The seal between the cover 17 and the shell 13 provides a gas-tight construction. The member 15 constitutes one terminal of the battery while the cap 16 constitutes the other terminal.

In constructing the battery above described, the cartridge and carbon electrode are assembled in the cup 10. The shell 13 is produced by an injection molding operation and is of uniform interior diameter throughout its entire length. The shank of the member 15 is projected through the closure aperture to seat the head 15b in the recess, after which the shank is swaged to form the head 15a. The assembled cup, cartridge and carbon electrode are inserted into the shell, after which the cover 17 is arranged on the rim of the cup 10 with the cap 16 receiving the end of the carbon electrode. Next, the rim of the shell is sealed to the cover either by heat and pressure or by use of a solvent and pressure. The cartridge is located in the shell by engagement of the end of the carbon electrode 12 with the inner surface of the cap 16.

I claim:

A battery comprising a metallic anode cup open at its upper end and containing a cartridge having a centrally arranged electrode, a shell of plastic material fitting over the cup and open at its upper end and closed at the lower end by an integral end wall provided with a small aperture, said shell having the edge of its open upper end extending beyond the open upper end of the cup, a plastic cover closing the open upper end of said shell and having a gas-tight seal with the edge of the shell, a metallic cap sealed in said cover with a portion of said cap exposed and with the end of said electrode received in said cap, and a rivet-like metal member consisting of a shank of small diameter filling the small aperture in the lower end wall of the shell, an inner head integral with shank and located within the shell in contact with said cup and an outer head exterior of said shell of substantial diameter, having its exposed surface flush with the outer surface of said shell.

FREDERICK A. KELLER.